Nov. 27, 1945. O. W. HOSKING 2,390,026
VALVE STEM
Filed March 19, 1941 2 Sheets-Sheet 1
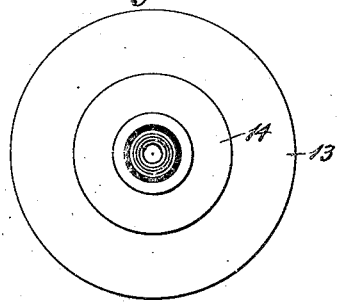
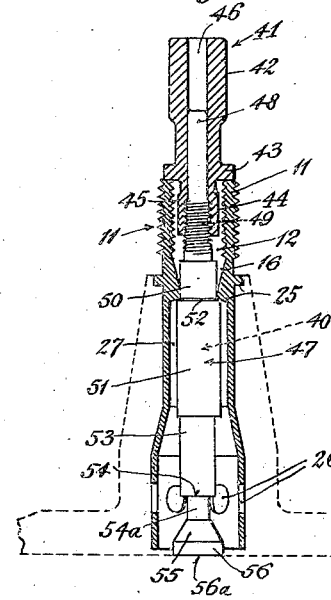
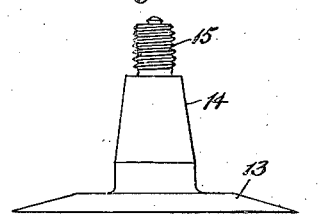
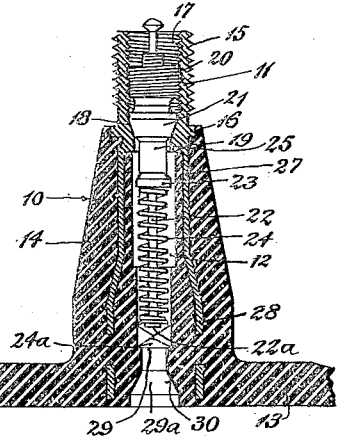
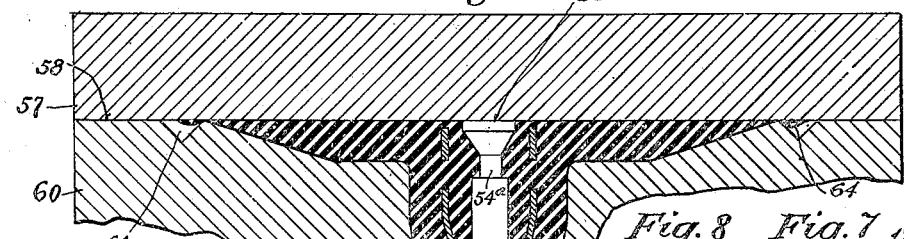
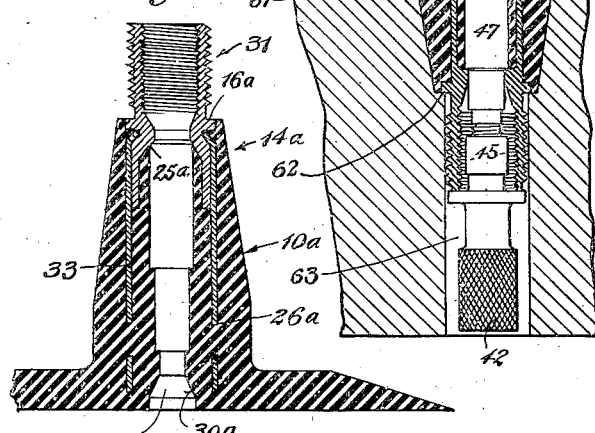
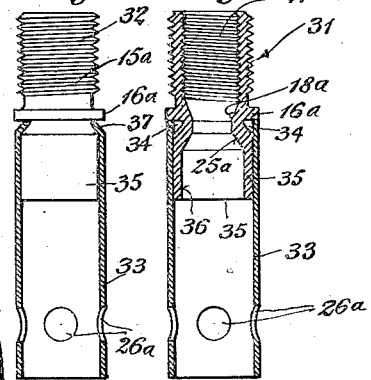
INVENTOR
Oakley W. Hosking,
BY
ATTORNEYS Nov. 27, 1945.  O. W. HOSKING  2,390,026
VALVE STEM
Filed March 19, 1941  2 Sheets-Sheet 2
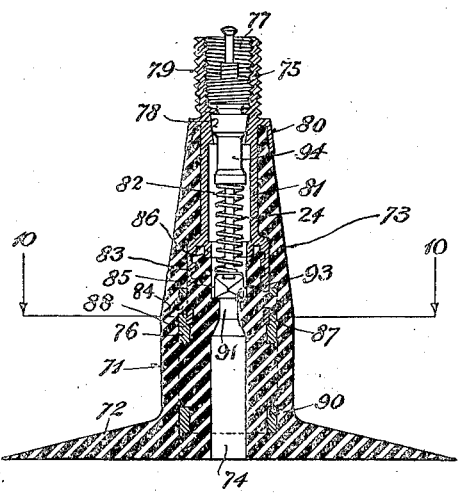
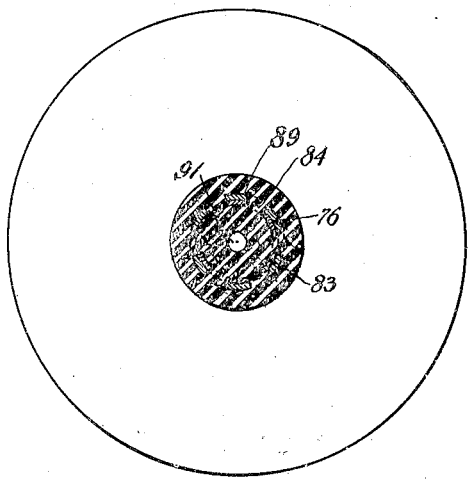
INVENTOR
Oakley W. Hosking,
BY
ATTORNEYS Patented Nov. 27, 1945

2,390,026

UNITED STATES PATENT OFFICE 2,390,026

VALVE STEM

Oakley W. Hosking, Monroe, N. Y.

Application March 19, 1941, Serial No. 384,173

5 Claims. (Cl. 152—430)

The present invention relates to rubber valve stems for inflating air containers such as the inner tubes of motor vehicle tires.

More particularly, the present invention relates to a valve stem having a resilient body and a rigid valve core-receiving insert embedded therein, having coaligned bores forming a passage through the stem.

The present application is a continuation in part of my previous application Serial No. 107,-832, filed October 27, 1936 which has since matured into United States Patent No. 2,232,530, granted Feburary 18, 1941, and of my copending application Serial No. 379,055, filed February 15, 1941, which has since matured into United States Patent No. 2,344,932, granted March 21, 1944, and which is a division of the aforesaid application.

It is an object of the present invention to provide valve stems of the aforesaid type having means for preventing the escape of air under pressure from the passage through the stem along the contiguous surfaces of the insert and rubber, to the exterior of the stem without relying upon adherence of the rubber to the insert; to reenforce the rubber against ballooning, and against distention of the rubber walls of the passage through the stem when they cooperate with portions of the valve mechanism; and to anchor the insert in the stem in such a manner that it is secured against blowing out of the tip of the rubber body under the influence of compressed air in the bore of the stem.

It has been proposed heretofore to prevent the escape of air between contiguous surfaces of the rubber and insert by adhering the rubber to the insert, but this requires special selection of materials and special preparation of the surface of the insert.

It has also been proposed, in cases where a rubber and metal junction is exposed to compressed air, to extend the rubber interiorly of the insert so that the compressed air holds the rubber against the insert to seal the contacting surfaces against escape of air between them, but the extent of the contiguous sealing surfaces heretofore contemplated was generally so small that the seal was ineffective.

According to the present invention, this problem is solved by extending the rubber internally of the insert and rendering the path around the insert between contacting surfaces of the interiorly lying rubber and of the insert relatively long either by providing transverse corrugations upon the embedded surface of the insert or by providing an insert having a relatively long interior surface covered by the interiorly lying rubber which extends substantially the entire length of that portion of the stem bore which is under air pressure.

In order to reenforce portions of the rubber walls of the stem bore which cooperate with portions of a valve core mechanism mounted therein, the insert is extended inwardly from the tip of the rubber body portion almost to its base.

Means interlocking the rubber of the stem with the insert are provided to prevent the latter from blowing out of the stem.

It is also an object of the present invention to provide an improved valve stem of the aforesaid type wherein the operations required for manufacture are materially simplified and rendered economical, the valve stem at the same time having the advantages hereinbefore set forth.

For this purpose, in the preferred form of the invention, a rigid insert is employed having a substantially smooth surface portion embedded in the rubber and depending upon contact of the interiorly lying rubber of the body with the relatively long continuous portion of said surface to provide an adequate seal against the escape of air around the insert. The rubber extends internally into the insert for substantially the entire length of that portion of the bore which is under pressure. By this means, widened portions of the passage through the stem which are normally provided to permit sufficient clearance for the flow of air past inwardly protruding portions of a valve core mechanism, as well as constrictions or other alterations in the wall of the passage adapted to cooperate with portions of such mechanism are formed by molding in the rubber itself, thus avoiding relatively expensive boring and counterboring operations which would be necessary if they were formed in the material of the insert.

As a result, the embedded portion of the insert may be formed by relatively economical spinning or drawing processes. The embedded portion of the insert may be constructed integral with the tip portion thereof or separately formed and then assembled with the tip portion.

With reference to the process for making a valve stem according to the invention by a molding process, it is an object to provide means for forming a bore through the rubber portion of the stem, requiring no pilot pins in the mold, permitting the use of rubber slugs having no apertures therein, and insuring that the passage through the stem will not be blocked by penetration of rubber into its bore; the use of the said means being adapted to simplify the operations attendant upon the introduction of portions of the stem and the rubber into the mold, whereby the present procedure is especially adapted for mass production.

These latter objects are accomplished by providing a core pin which is separately assembled with an insert, especially of the aforesaid preferred form of valve stem, before molding the rubber around it; forming a solid slug of uncured rubber, and adhering it to the assembled insert and core pin; placing the resulting assembly in a suitable mold; molding and vulcanizing the rubber under heat and pressure; and finally removing the core pin from the stem after the mold contents have been removed from the mold and allowed to cool.

Three specific embodiments of the valve stem of the invention, and also the process for making the first two modifications are hereinafter described, referring to the accompanying drawings, in which:

Figure 1 is a full-size plan view of the finished valve stem of the present invention.

Fig. 2 is a side elevational view of the valve stem of Fig. 1.

Fig. 3 is an enlarged central vertical cross-section of a valve stem according to the present invention, including a valve core of the conventional type assembled therewith.

Fig. 4 is an enlarged central vertical cross-section of the metal insert of the valve stem of Fig. 1, prior to molding of the rubber portion thereof, and assembled with a core pin for forming a bore in the molded stem.

Fig. 5 is an enlarged central vertical cross-section of a mold for forming a valve stem of the present invention showing the relative positions of the metal insert, rubber, and core pin during the molding process.

Fig. 6 is an enlarged central vertical cross-section of a modification of the valve stem of the present invention.

Fig. 7 is an enlarged central vertical cross-section of the insert of the valve stem of Fig. 6, in an intermediate stage of manufacture.

Fig. 8 is an enlarged side view of the completed insert of Fig. 7, the upper member thereof being shown in side elevation and the lower portion in central vertical cross-section.

Fig. 9 is an enlarged central vertical cross-section of a third embodiment of the present invention.

Fig. 10 is a cross-section of the valve stem of Fig. 9 along the line 10—10.

Fig. 11 shows a valve for cooperating with the integral seat.

The valve stem as illustrated in Figs. 1 to 5 inclusive, constituting one of the preferred embodiments of the invention, comprises a rubber body portion 10 and a rigid insert 11, preferably of metal, embedded in the rubber, said stem having a passage 12 extending from its base to its tip through the rubber and metal portions thereof.

The rubber body portion comprises a base flange 13 for securing the valve stem into an air container, and a stem portion 14 extending outwardly from the flange.

The rigid insert 11 comprises a tubular metal member, part of which protrudes from the tip of the rubber body 10. The protruding portion thereof may be provided with external threads 15, as shown, for engaging a cap or similarly threaded elements, and is preferably provided with an external annular flange 16 inwardly of said threads, the rubber of the body 10 surrounding the external surface of the insert, below said flange.

Internally, the insert 11 may be threaded adjacent its tip as indicated at 17, and provided with a conical seat 18 inwardly of the threads, said seat and threads being adapted to receive and retain a valve core of the conventional type, shown in Fig. 3, comprising a barrel 19 with external threads 20 to cooperate with the threads 17 and a conical portion or gasket 21 fitting the conical seat 18 in air-tight relation. A valve pin 22 extends through an axial passage in said barrel and carries a valve closure 23 at its lower end for sealing the axial passage against efflux of air. The valve core may also include resilient means such as a compression spring 24 for yieldingly urging the valve closure against the end of the axial passage. The spring 24 is retained on pin 22 by means of an abutment member 24a slidably carried on the pin at its lower end, and retained thereon by an enlargement 22a.

Below, or inwardly of, the conical seat 18, the passage through insert 11 is widened to form an inwardly facing shoulder 25, and the rubber of the body portion 10 of the stem extends internally of said insert from its lower end or base substantially to said shoulder.

The inner portion of the insert 11 which is surrounded both internally and externally with the rubber of the body 10 extends, according to the invention, almost to the base of the body. The inner portion of the insert is skirt-like in shape, and its inner end may be of greater diameter than the portion adjacent its shoulder 25, whereby its engagement with the rubber of the body portion is rendered more effective to prevent ejection of the insert from the rubber by air under pressure within the bore of the stem, and whereby the inclusion of a greater thickness of interiorly lying rubber is made possible, a feature which is sometimes desirable, for instance, to afford increased yielding properties in the thickened portions of the rubber walls of the passage through the stem adjacent its base. Furthermore, in order to provide means for positively anchoring insert 11 in the rubber body 10, the skirt of the insert may be provided with a series of apertures 26 (see Fig. 4) through which the rubber of the body portion extends to form an interlock with the insert, retaining it against blowing out of the tip of the rubber body under the influence of air under pressure in the bore of the stem.

As indicated in the drawings, the passage 12 below shoulder 25 extends through the rubber lying interiorly of insert 11 and through the rubber base flange 13. When the stem is used with a valve core of the conventional type as shown in Fig. 3, passage 12 is sealed above shoulder 25 by engagement of the conical gasket 21 on the barrel of the valve core with conical seat 18. Thus the rubber forming the walls of the passage below shoulder 25 is subjected to the pressure of the compressed air in the inflated air container to which the stem is attached and is urged radially outward thereby against the contiguous interior surface of insert 11. Because of the relatively long continuous surface of the insert between shoulder 25 and apertures 26 which is contiguous to the interiorly lying rubber, this effectively prevents the escape of air from the bore of the stem which might otherwise occur by creeping of the air around the surface of insert 11 from the junction of the rubber and metal below shoulder 25 to the exterior rubber metal junction at flange 16.

Moreover, since the embedded portion of insert 11 extends almost to the base of the rubber body, it reenforces the stem portion 14 of the body for substantially its entire length and prevents ballooning of the rubber by the compressed air in passage 12.

Inwardly of the shoulder 25 the rubber walls of passage 12 are cylindrically shaped as indicated at 27, the diameter of the passage being sufficient at this point to provide ample clearance for passage of air past inwardly protruding portions of the valve core mechanism. Inwardly of cylindrical portion 27, the walls of the passage may be constructed cylindrically as indicated at 28, but of smaller diameter than that of portion 27 since the spring 24 of the conventional valve core which extends into the portion 28 of the passage affords sufficient clearance for passage of air.

Preferably, the cylindrical portion 28 terminates in an outwardly facing annular shoulder 29 formed in the rubber wall, said shoulder providing a support for the abutment member 24a and the compression spring 24 of the valve core mechanism. The lower end of insert 11 surrounds said shoulder and extends above and below the same, thus reenforcing it against distention which might cause it to give way and release the abutment member 24a and the spring 24 supported thereby.

Below shoulder 29, the passage 12 is constricted as indicated at 29a, and may be widened to the base of the rubber flange 13 presenting an inwardly faced conical rubber valve seat 30 for cooperating with special types of valve cores, which may also be used with the specifically described valve stem, including a valve pin provided with a closure adapted to cooperate with an integral rubber valve seat within the bore of a valve stem. Such a valve core is disclosed in my previous application Serial No. 107,832 filed October 27, 1936 which has since matured into United States Patent No. 2,232,530, granted February 18, 1941, and also in my copending application Serial No. 379,055 filed February 15, 1941, which has since matured into United States Patent No. 2,344,932, granted March 21, 1944, and which is a division of the said previous application.

The core, as shown in Fig. 11 has a threaded sleeve 20a adapted to be threaded into the end of the insert. The sleeve carries a spring pressed pin 21a having a valve head on the end thereof. The upper surface of the valve engages the tapered surface 30 of the bore and cooperates therewith to prevent passage of air from the tire or other device.

The lower end of insert 11 preferably extends above and below said integral rubber valve seat, and reenforces it against such distention as would permit the blowing out of a special valve core of the latter type.

By forming the walls of the passage 12 inwardly of the shoulder 25, of rubber, a material economy in the manufacture of the valve stem is effected. Namely, if the widened cylindrical portion 27 of the passage were formed in the metal of insert 11, it would require an additional counterboring operation in the manufacture of the insert; and if a part of the narrower cylindrical portion 28 were also of metal, the counterboring operation would be even more seriously complicated. Since these cylindrical parts of the walls of the passage 12 are of rubber, they may be formed by relatively simple molding processes and the entire skirt portion may be formed by drawing or spinning.

A modification of the valve stem of Figures 1 to 5 is illustrated in Figs. 6 to 8 inclusive, having substantially the same advantages as the above described valve stem, but including a modified form of insert which lends itself even more readily to economical manufacture.

In this form of the invention, the insert 31 comprises two metal parts, namely, a tip member 32 and a skirt member 33. The tip member 32 includes external threads 15a, an external annular flange 16a, internal threads 17a, a conical seat 18a and an interior inwardly faced shoulder 25a, shown as a conical surface, corresponding to the similar elements of structure of insert 11. Below external flange 16a, an annular groove 34 is formed, preferably having a V-shaped notch-like cross-section as shown, with the upper side substantially normal to the axis of the insert and the lower wall forming an angle of about 45° therewith. Below the groove 34, the tip member is provided with a short cylindrical extension 35. The interior surface 36 of the cylindrical extension below the conical shoulder 25a is also substantially cylindrical, having a diameter comparable with that of the skirt portion of insert 11 below shoulder 25.

The skirt member 33 is simply a length of metal tubing comprising, near its lower end, a series of apertures 26a serving the same purpose as apertures 26 of insert 11, and having an internal diameter such that it is adapted to slide telescopically over cylindrical extension 35. Preferably, external flange 16a is of greater diameter than the bore of skirt member 33 to provide an abutment limiting the extent to which the latter member may slide over member 32, whereby relative positioning of the two members in assembling the insert is facilitated.

Member 33 is assembled with member 32 by sliding it over extension 35 until its end abuts flange 16a. The abutting end of the skirt is rolled into groove 34 as indicated at 37, thus securing the two members together against longitudinal separation, while the telescopically engaged surfaces of the two members hold them in mutual alignment. In order to render the joint between the two members airtight, member 33 may be sweated onto member 32 in the manner well known in the art.

The rubber body 10a of the valve stem of Fig. 6 is substantially identical with the rubber body 10 insofar as its external shape and internal bore are concerned and embeds the assembled insert 31 in the same manner as body 10 embeds insert 11. The rubber of the stem portion 14a covers the exterior of insert 31 to the annular flange 16a, and extends interiorly of said insert to conical shoulder 25a. The lower end of the skirt member 33 extends almost to the base of body 10a and the rubber of the body portion is interlocked therewith by extension through apertures 26a, to retain the insert against blowing out. The skirt member 33 together with cylindrical extension 35 reenforces the interiorly lying rubber to avoid ballooning of the stem, as well as undesirable distention of the integral rubber shoulder 29a or valve seat 30a.

Air under pressure within the bore of the valve stem forces the interiorly lying rubber against the internal walls of tip member 32, and also against the internal walls of skirt member 33, effectively sealing the possible path of egress for compressed air within the bore from the internal rubber-metal junction at the shoulder 25a, around the insert to the external rubber-metal junction at flange 16a. If the insert members 32 and 33 are not secured together in airtight relation as by seating, the interiorly lying rubber forms a seal against the wall of tip member 32 as a result of internal air pressure and also tends to form a seal at the internal junction of the said members. However, this sealing effect is not as reliable as that obtained by integrally joining the two members in an airtight manner whereby substantially the full length of the skirt member 33 is available as a sealing surface.

A third embodiment of the invention possessing certain of the advantageous characteristics of the valve stems of Figs. 1 to 8, is illustrated in Figs. 9 and 10. In this construction, a rigid tubular metal insert also extends into the tip of a rubber body 71 having a base flange 72 and a stem portion 73, said insert extending almost to the base of the rubber body. A passage 74 extends through the rubber body and the metal insert from the base to the tip of the stem.

The insert comprises an outer or tip member 75 and an inner embedded member 76, the former having internal threads 77 extending inwardly from its tip and an internal conical seat 78 inwardly of the threads 77 for receiving and retaining a valve core 94 of the conventional type similar to that illustrated in Fig. 3. External threads 79 adjacent the tip are also provided for engaging threaded means, such as a cap or an air chuck and inwardly thereof a ferrule shaped flange 80 extends toward the base of the stem. A cylindrical tubular portion 81 extends inwardly of the flange 80 and conical seat 78, the bore 82 of which is wide enough to provide adequate clearance for passage of air around inwardly protruding portions of the valve core mechanism. A widened skirt 83 depends from the lower end of the tubular portion 81, said skirt having an outer cylindrical surface, lateral apertures 84 adjacent its lower end, and annular ribs 85 on its interior walls. A short annular flange 86 of somewhat reduced diameter may also depend from the lower end of tubular portion 81 interiorly of said skirt.

The inner insert member 76 is a tubular piece of metal having a counterbore 87 terminating at a shoulder 88, the counterbore portion being adapted to slide telescopically over the outer cylindrical surface of the skirt 83 until the end of the latter abuts the shoulder 88. The walls of the counterbore are provided with apertures 89 adapted to register with apertures 84 in the skirt when the members are telescopically engaged. Adjacent its lower end, the said member is provided with axially elongated apertures 90.

The rubber of the body is molded around the assembled insert members, the tip of stem portion 71 extending into and filling the ferrule shaped flange 80 and covering the exterior surface of said members. The rubber also extends internally of the insert members filling the skirt member 83 and extending into the lower edge of depending flange 86. Furthermore, the rubber extends through the registered apertures 84 and 89 securing the insert members against separation and retaining the outer members 75 against blowing out of the stem under the influence of compressed air in the bore of the stem, and also through apertures 90 at the lower end of inner member 76 for anchoring this member in the rubber. Below flange 86, passage 74 extends through the rubber of the body and is constricted as shown at 91, forming a rubber shoulder 92 facing the tip of the stem and adapted to support abutment member 24a and spring 24 above said conventional valve core and also forming a conical rubber valve seat 93 facing the base of the stem and adapted to cooperate with the valve closure of a special type valve core above referred to and disclosed in my previous application, Serial No. 107,832, now Patent No. 2,232,530.

Since the rigid insert members surround substantially the entire length of the rubber forming the walls of the passage 74 through the stem the rubber of the stem is rigidly reenforced against ballooning, preventing the accompanying distention of the constriction 91 which would render shoulder 92 inoperative to support spring 24, or valve seat 93 inoperative to cooperate with a valve closure of the aforesaid special type valve core.

Likewise, since the insert members 75 and 76 surround the constriction 91 and extend above and below said constriction, the shoulder 92 and valve seat 93 are reenforced against yielding to the pressure of spring 24 or the air pressure tending to force the special type valve closure through the constriction.

When a conventional type valve core is used the compressed air within the bore of the stem urges the interiorly lying rubber outward, sealing the contact between the interiorly lying rubber and the corrugated inner surface of skirt 83 against escape of air between the said surfaces.

The present invention also relates to an improved method for molding the above-described preferred valve stems of Figs. 1 to 8 inclusive, this method being illustrated in Figs. 4 and 5 of the drawings as applied for use in the case of insert 11, but similarly applicable in the case of insert 31.

According to the invention, the improved molding method comprises first assembling the rigid insert with a core pin, adapted during a subsequent molding operation to seal the passage through the valve stem at shoulder 25 or 25a against flow of rubber, and having a portion adapted to form a passage inwardly of said shoulder through the rubber to the base of the stem. The core pin thus performs the function ordinarily effected by means of pilot pins extending into the bore of a metal insert from one or both ends of a molding die during the molding of rubber around the insert.

As shown in Fig. 4, core pin 40 comprises two separable parts adapted to be secured together by draft means. The tip portion 41 of the core pin comprises a cylindrical member having a knurled handle 42, an annular flange 43 adapted to engage the tip of insert 11 and a boss 44, adapted to protrude into the tip of insert 11, and having an internally threaded socket 45 at its lower end. From the well of the socket, a bore 46 extends axially to the end of the knurled handle.

The core-forming member 47 of the core pin comprises a terminal stem 48 adapted to slide telescopically into the bore 46, and adjacent thereto, a threaded portion 49 is provided for engaging the threads of socket 45. A cylindrical portion 50 extending inward from the threads is adapted to fit the aperture of insert 11 between shoulder 25 and conical seat 16.

The mid-portion 51 of member 47 is also cylindrical, but of larger diameter than said aperture and is adapted to form the widened cylindrical portion 27 of passage 12 through the valve stem. At the upper end of cylindrical portion 51, adjoining cylinder 50, an annular shoulder 52 is provided which is adapted to seat against shoulder 25 and to form a seal therewith against the flow of rubber past this junction during molding.

Beyond the mid-portion 51, member 47 includes a cylindrical extension 53 adapted to form the cylindrical walls 28 of passage 12 and terminating in a shoulder 54 which forms the outwardly faced shoulder 29 in the said passage. Below shoulder 54, a reduced cylindrical portion 54a is provided to form the constriction 29a, and a conical surface 55 is provided to form the integral rubber valve seat 30 in the passage 12, member 47 terminating in a cylindrical portion 56 adapted to form the lower end of passage 12. The end surface 56a of member 47 is preferably constructed to be flush with the lower surface of the rubber base flange 13.

The core pin 40 is assembled with insert 11 by inserting core-forming member 47 into the lower end of the insert, and the tip member 41 into the tip of the insert, and then screwing threaded socket 45 over the threaded portion 49 to draw the two parts together until flange 43 is clamped against the tip of the insert and shoulder 52 is clamped against shoulder 25 to form a seal against the flow of plastic rubber past this point. Cooperation of the cylindrical portion 50 with the aperture in insert 11 above shoulder 25 and of stem 48 with the bore 46 of tip member 41 serves to center the core pin in the insert.

The mold for forming the rubber valve stem of the invention comprises an upper die 57 having a flat surface 58 for molding the base of flange 13 of the rubber body 10, and a lower die 60 having a mold cavity 61, the walls of which conform to the exterior shape of the rubber stem portion 14 as well as the upper surface of flange 13.

The inner end of the cavity 61 preferably includes a shoulder 62 for engaging annular flange 16 on the insert 11 to seal the mold cavity against egress of rubber at this point. An extension 63 of the said cavity provides space for the tip of insert 11, and for the handle 42 of the core member 40. The extension 63 is preferably open at its lower end to permit access to the knurled handle 42 of core pin 40 so that the latter may be pushed upward to eject the valve stem from the mold after the molding operation is complete.

Uncured rubber for forming the body portion 10 of the valve stem may be provided in the form of solid rubber slugs which are relatively simple to preform by extrusion while avoiding overheating which would tend to partly vulcanize the rubber.

In other valve stem molding processes where pilot pins are used, it is generally necessary to provide slugs of crude rubber having apertures therein in order to avoid rubber entering the bore of the stem during the closing of the mold before the pilot pins can seal the passage against influx of the rubber. The extrusion of apertured rubber slugs is relatively slower than solid slugs and often results in deleterious overheating of the rubber. The avoidance of this disadvantage is made possible in the present invention by the use of a core pin preassembled with the metal insert instead of pilot pins, to form the rubber bore in the stem.

After the core pin 40 is assembled with the metal insert 11, an imperforate rubber slug is adhered to the core pin 40, for instance, by merely pressing the latter into the surface of the slug. The resulting assembly is inverted and dropped into the cavity 61 of die 60 which is heated by suitable means to molding temperature. The upper die 57, also preferably heated, is lowered under pressure until the mold is closed, forcing the rubber into the cavity surrounding the core-forming member 47 and the skirt portion of insert 11. The flat-surfaced end 56a of member 47 preferably rests against the surface of the upper molding die 57. Excess rubber is forced into the usual flash groove 64 surrounding the mold cavity.

The contents of the mold is heated sufficiently to vulcanize the rubber. The mold is then opened and the core removed, for instance, by pushing upward against the end of the core pin tip member 41.

Tip member 41 is then unscrewed from the core-forming member 47 and the latter pushed out through the lower end of the valve stem. The rubber shoulder 29 and valve seat 30 yield sufficiently to permit removal of the core-forming member. This operation insures opening of the passage 12 throughout the base of the stem even if a flash of rubber has covered the end 56a of member 47 during molding. Thus, the present molding method insures the formation of the through passage in the valve stem, and effectively removes rubber which might tend to obstruct said passage.

In molding the valve stem of Figs. 6 to 8 inclusive, the same procedure is followed. The same mold and substantially the same core pin may be used, the latter differing from core pin 40, if desired, only in the construction of shoulder 52 of a conical shape adapted to fit conical shoulder 25a rather than shoulder 25.

The above described molding process is highly advantageous for mass production. Economy is effected in the manufacture of the metal insert, not only in the case of the insert of Figs. 1 to 5, but even more so in the case of the insert shown in Fig. 6. Economy in time and effort is also effected in that nonapertured rubber slugs may be used which may be preadhered to the end of the core pin, whereby the entire mold contents may be dropped into the mold cavity at the same time.

In mass production methods heretofore used, the metal insert and rubber slugs were separately dropped into the mold cavities of a multiple mold, requiring the use of separate positioning or distributing racks for the rubber and metal respectively. According to the present invention, only one positioning rack is necessary to place the structures in the mold, thus simplifying the requisite machinery.

Variations and modifications may be made within the scope of this invention and portions of the improvements may be used without others.

I claim:

1. A valve stem comprising a rubber body having a stem portion and an integral rubber flange at its base; a rigid insert extending into said body from the tip of the rubber stem almost to the base of said flange, said insert and body having portions forming aligned bores producing a through passage through the stem; means formed by the interior walls of said insert adapted to cooperate with a conventional valve core having its own valve seat and valve closure, for closing the passage against efflux of air, the rubber of said body portion extending interiorly of the insert from its base to a portion below said means whereby the end of the rubber is exposed to the air in said stem, the bore through said interiorly lying rubber being widened for a short distance below said means to provide clearance for passage of air past inwardly protruding portions of a valve core adapted to be secured in the stem, the bore of said interiorly lying rubber being constricted at the inner end of said widened portion to provide an inwardly facing rubber valve seat formed by the inner end of said constriction and adapted to cooperate with a valve core having a closure adapted to cooperate with an integral valve seat, said valve seat being reenforced by extension of the embedded portion of the insert above and below said valve seat; and a series of apertures in said insert near its base through which the rubber of the body portion extends to provide an interlock with said body, the interior surfaces of said insert which contact the interior of the lying rubber being substantially smooth and the outward radial pressure of compressed air in the bore of the stem being adapted to form a seal preventing the escape of air between said contacting surfaces.

2. In a valve stem of the type described, a rigid tubular metal insert comprising a tip member having means in its bore for receiving and retaining therein a valve core and inwardly of said means, an annular shoulder facing the base of the stem; said tip member terminating in a cylindrical tubular portion extending inwardly beyond said shoulder, with an annular groove in its exterior surface; and a skirt member comprising a metal tube fitting telescopically over said cylindrical portion, secured thereto by a portion of the end of said skirt extending into said groove, and cooperating with the walls thereof, said skirt extending inward beyond the inner end of said tip member; said skirt member having apertures near its lower end and a substantially smooth surface, the distance from said annular shoulder to the inner end of said skirt constituting the major portion of the length of the insert.

3. In a valve stem of the type described, a rigid tubular metal insert comprising a tip member having means in its bore for receiving and retaining therein a valve core, said tip member having an exterior groove therearound and a smooth cylindrical surface at its inner end; and a metal skirt having at its outer end a substantially smooth cylindrical surface telescopically engaging the cylindrical surface of the tip member and having a portion extending into said groove to cooperate with the walls thereof to secure the skirt to the tip, the skirt extending beyond the inner end of said tip member to form the major portion of the length of the insert.

4. In a valve stem of the type described, a rigid tubular metal insert comprising a tip member having means in its bore for receiving and retaining therein a valve core and a V-shaped exterior groove therearound and a metal skirt having a substantially smooth surface engaging said tip and having the end thereof extending into the V groove to secure the tip and skirt together, said skirt extending inwardly beyond the inner end of said tip member and having a greater diameter at its lower end than adjacent said tip member.

5. A valve stem including a rigid tubular metal insert comprising a tip member having means in its bore for receiving and retaining therein a valve core, said tip member having an exterior groove therearound, and a smooth cylindrical surface at its inner end; a metal skirt having at its outer end a substantially smooth cylindrical surface telescopically engaging the cylindrical surface of the tip member and having a portion extending into said groove to cooperate with the walls thereof to secure the skirt to the tip, the skirt extending beyond the inner end of said tip member to form the major portion of the length of the insert; and a body of rubber surrounding the skirt and a part of the tip and extending beyond and covering the groove and portion of the skirt therein.

OAKLEY W. HOSKING.